(12) United States Patent
Hyun

(10) Patent No.: US 11,684,054 B2
(45) Date of Patent: Jun. 27, 2023

(54) SPOOL BRAKING DEVICE USING EDDY CURRENT AND FISHING REEL HAVING SAME

(71) Applicant: DOYO ENGINEERING CO., LTD., Bucheon (KR)

(72) Inventor: Kang Ho Hyun, Bucheon (KR)

(73) Assignee: DOYO ENGINEERING CO., LTD., Bucheon (KR)

(*) Notice: Subject to any disclaimer, the term of this patent is extended or adjusted under 35 U.S.C. 154(b) by 0 days.

(21) Appl. No.: 17/565,958

(22) Filed: Dec. 30, 2021

(65) Prior Publication Data
US 2022/0201998 A1  Jun. 30, 2022

(30) Foreign Application Priority Data
Dec. 30, 2020 (KR) .................. 10-2020-0187386

(51) Int. Cl.
*A01K 89/01* (2006.01)
*A01K 89/0155* (2006.01)

(52) U.S. Cl.
CPC .......................... *A01K 89/01555* (2013.01)

(58) Field of Classification Search
CPC . A01K 89/01555; H02K 49/04; H02K 49/046
See application file for complete search history.

(56) References Cited

U.S. PATENT DOCUMENTS

| 4,572,454 | A  | * | 2/1986  | Furomoto | A01K 89/01555 310/93 |
| 5,108,042 | A  | * | 4/1992  | Puryear  | A01K 89/0192 242/310 |
| 6,206,311 | B1 | * | 3/2001  | Kim      | A01K 89/01555 242/304 |
| 2014/0353414 | A1 | * | 12/2014 | Yeh    | A01K 89/033 242/291 |
| 2016/0235048 | A1 | * | 8/2016  | Ikebukuro | A01K 89/045 |
| 2017/0339935 | A1 | * | 11/2017 | Toake   | A01K 89/056 |
| 2020/0236919 | A1 | * | 7/2020  | Kano    | A01K 89/045 |
| 2021/0100233 | A1 | * | 4/2021  | Hyun    | A01K 89/01555 |

FOREIGN PATENT DOCUMENTS

| JP | 6093844 | B1 | * | 3/2017 | ........... A01K 89/006 |
| KR | 200345064 | Y1 | * | 3/2004 | ....... A01K 89/01555 |
| KR | 20120112132 |    |   | 10/2012 | |
| KR | 20120133584 |    |   | 12/2012 | |
| KR | 20150006698 |    |   | 1/2015 | |

* cited by examiner

*Primary Examiner* — Emmanuel M Marcelo
(74) *Attorney, Agent, or Firm* — Cantor Colburn LLP

(57) ABSTRACT

Provided are a spool braking device and a fishing reel equipped with the spool braking device. In the spool braking device, a magnet holder with a magnet moves toward an axial direction of a spool using eddy current and thus controls a rotational speed of the spool through a varying magnetic force acting on a braking plate of the spool. The spool braking device is capable of preventing a decrease in a distance a lure travels during casting when the spool is rotated at a low speed and preventing a backlash phenomenon through a braking operation suitable for high-speed rotation of the spool.

7 Claims, 16 Drawing Sheets

SPOOL BRAKING DEVICE USING EDDY CURRENT AND FISHING REEL HAVING SAME

BACKGROUND OF THE INVENTION

Field of the Invention

The present disclosure relates to a spool braking device and a fishing reel equipped with the spool braking device, the spool braking device in which a magnet holder with a magnet moves toward an axial direction of a spool using eddy current and thus controls a rotational speed of the spool through a varying magnetic force acting on a braking plate of the spool. The spool braking device is capable of preventing a decrease in a distance a lure travels during casting when the spool is rotated at a low speed and preventing a backlash phenomenon through a braking operation suitable for high-speed rotation of the spool.

Description of the Related Art

Generally, a rotation speed of a spool from which a fishing line is wound is higher than a flying speed of a lure when a fishing reel is cast. Therefore, there occurs a backlash phenomenon where the lure does not travel a long distance or where the fishing line is tangled.

In order to prevent the backlash, brakes in the fishing reel are broadly divided into friction brakes and magnet brakes. The friction brakes use physical friction, and the magnet brakes use magnetic attraction.

The friction brakes in the related art include centrifugal-force brakes. The centrifugal-force brake has a maximum rotational force at initial casting. In the centrifugal-force brake, a brake shoe is brought into direct contact with a braking plate, thereby generating friction. Accordingly, a gradual reduction in a rotational force reduces a rotation speed of a spool and thus a rotational braking force of the friction brake (that is, a rotational force of the spool and a braking force thereof are proportional to each other). The friction brake has an advantage over the magnet brake in terms of long-distance casting. However, fine adjustment of the braking force is difficult, and friction between the brake shoe and the braking plate causes high wear or high noise.

The magnet brake for solving the above-described problem is a non-contact brake that is different from the friction brake in that friction is not involved. The magnet brake uses magnetic forces of a plurality of braking magnets provided on a reel main body. An attraction force of the magnet on the rotating spool reduces the rotation speed of the spool.

In the magnet brake in the related art, the braking magnet and the braking plate are not brought into contact with each other. Thus, unlike the friction brake, the magnet brake has the advantage that noise and wear of a component do not occur and that the fine adjustment of the braking force is easy. However, regardless of the rotational speed of the spool, the braking force is constant. Therefore, when the spool is rotated at a low speed, the braking force continuously occurs. Thus, there occur problems, such as a reduction in the distance by which the lure travels during casting.

There is also an inertial-force brake in which a movable spool plate is attached to the magnet brake. In the inertial-force brake, when the spool is rotated, with an inertial force, the spool plate is brought into proximity with the braking magnet, thereby reducing the rotational speed of the spool. The inertial force is generated in an axial direction perpendicular to a spool shaft. Thus, a distance by which a spool plate is moved per an actual rotational speed of the spool is not precise. Thus, there occurs a problem in that an increase and a decrease in the braking force cannot be precisely controlled.

Examples of the related art include Korean Patent Application Publications Nos. 10-2015-0006698, 10-2012-0112132, and 10-2012-0133584.

SUMMARY OF THE INVENTION

An objective of the present disclosure is to provide a spool braking device and a fishing reel equipped with the spool braking device. In the spool braking device, a magnet holder is displaced while moving or rotating backward and forward using eddy current generated between a magnet not rotating and a braking plate rotating together with a spool, thereby generating and increasing an additional braking force.

According to an aspect of the present disclosure, there is provided a spool braking device including a braking plate provided on a first-side surface of a spool; a magnet holder having a magnet that is formed in a manner that faces the braking plate; and a holder displacement unit displacing the magnet holder using eddy current that is generated between the braking plate and the magnet when the spool is rotated, wherein, when the spool is rotated, while moving in an axial direction of the spool, the magnet holder controls a rotational speed of the spool with a magnet force that varies with a distance between the braking plate and the magnet.

In the spool braking device, the braking plate and the magnet arranged on the magnet holder may have a non-overlapping opposite surface.

In the spool braking device, the holder displacement unit may be combined with a dial provided on a side cover at a first side of the spool cover and may include: a receding portion, a pressing portion, or both that are formed as a cam that has a bottom point and a top point that are obliquely connected to each other in a circumferential direction; and a first elastic body that elastically supports the magnetic holder in a first-side direction of increasing a distance to the braking plate.

The spool braking device may further include a slide cam into which an axial mount portion of the magnet holder is inserted, wherein the pressing portion may be configured as a first end cam that protrudes toward a second side along a circumferential direction from the slide cam and the receding portion may be configured as a receding protrusion that protrudes from an outer circumferential surface of the axial mount portion and is brought into contact with the first end cam.

The spool braking device may include a dial cam that is combined with a dial on the side cover, and has a second end cam that protrudes toward a second side along a circumferential direction and has a bottom point and a top point that are obliquely connected to each other, wherein the slide cam may include a guide protrusion that protrudes in such a manner as to be brought into contact with the second end cam.

In the spool braking device, a plurality of magnets may be radially arranged in the circumferential direction on the magnet holder, and the magnet holder may include a magnet non-mount unit, on which a magnet is not mounted, in a predetermined section in the circumferential direction, wherein the slide cam may include an end jaw portion protruding inward from a top point of the first end cam and being connected, a wing portion provided at a position corresponding to the magnet non-mount unit, and an auxiliary magnet mounted on the wing portion and has the same polarity as the magnet.

In the spool braking device, the magnet holder may include an axial mount portion that is inserted into a front-surface axial portion of the spool cover, wherein the pressing portion may be configured as a first end cam that protrudes from an outer circumferential surface of the front-surface axial portion and is formed along a circumferential direction, and the receding portion may be configured as a receding protrusion that protrudes from an inner circumferential surface of the axial mount portion and is brought into contact with the first end cam.

The spool braking device may include: a pressing plate that is arranged between the spool cover and a magnet holder and controls a distance by which the magnet holder moves; a slide cam that is connected to the pressing plate at a first side of the spool cover and has a second end cam having a bottom point and a top point that are obliquely connected to each other in a circumferential direction; a dial cam that is combined with a dial on a side cover and has a third end cam that protrudes along the circumferential direction in such a manner as to take on a shape corresponding to the second end cam and is brought int contact with the second end cam; and a second elastic body that elastically supports the slide cam toward a first-side direction of increasing a distance to the spool cover.

The spool braking device may include a slide cam that is connected in such a manner as to be rotatable or movable backward and forward in a first direction or bidirectionally, together with the magnet holder, wherein the receding portion may be configured as a first end cam that protrudes from an inner circumferential surface of the slide cam and has a bottom point and a top point that are obliquely connected to each other in a circumferential direction, and the pressing portion may be configured as a pressing protrusion that protrudes toward the first end cam at a first side of the slide cam and is brought into contact with the first end cap.

The spool braking device may include a dial cam that is combined with a dial on a side cover and includes the pressing protrusion.

According to another aspect of the present disclosure, there is provided a fishing reel including a frame having a spool mounting unit, a spool mounted on the spool mounting unit, and a spool braking device described above.

In the spool braking device and the fishing reel equipped with the spool braking device according to the present disclosure, the magnet holder having the magnet advances toward the braking plate of the spool in the axial direction of the spool shaft using the eddy current, and thus the magnet generates and increases an additional braking force is generated and increased. Thus, the effect of controlling an increase or a decrease in the braking force automatically and finely according to an actual rotation speed of the spool can be achieved.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1A:
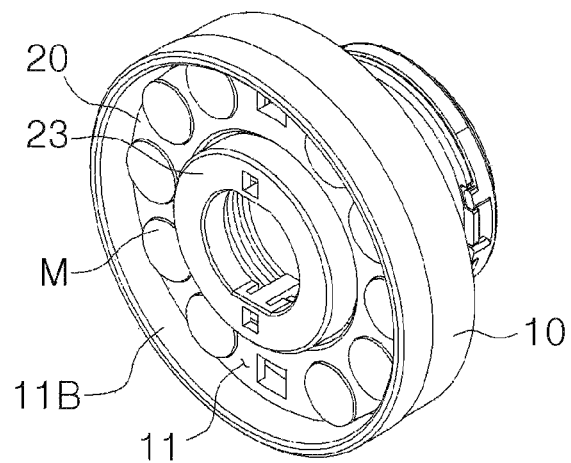
FIGS. 1A and 1B are perspective views each illustrating essential components according to a first embodiment of the present disclosure.

Various modifications can be made to the present disclosure, and the present invention can be embodied in various forms. Implementation examples (aspects or embodiments) of the present disclosure will be described in detail in the present specification. However, this description does not limit the present disclosure to specific embodiments, and all alterations, equivalents, and substitutes that are included within the technical idea of the present disclosure should be understood as falling within the scope of the present disclosure.

In each of the drawings, the same reference characters, particularly, reference characters having the same number in the ones column and the same number in the tens column, or reference characters having the same number in the ones column, the same number in the tens column, and the same alphabet, are defined as referring to constituent elements having the same or similar functions. Unless otherwise specified, this definition provides a basis for identifying a constituent element referred to by a reference character in each of the drawings.

In addition, in each of the drawings, for the convenience of understanding and the like, a constituent element is expressed in a manner that is exaggeratedly increased (or decreased) in size or thickness, or in a simplified manner. However, this expression should not provide a limited interpretation in a manner that narrows the scope of the present disclosure.

The terms used through the present disclosure is only for describing a specific implementation example (a specific aspect or embodiment) of the present disclosure and is not intended to impose any limitation to the present disclosure. The indefinite article "a/an" is used to mean one or more, not only one, except as distinctively expressed in context.

It should be understood that the term, such as "include" or "configured", which is used in the present specification, is intended to indicate that a feature, a number, a step, an operation, a constituent element, a component, or a combination thereof which is described in the present specification, is present, and that the team does not negate in advance the likelihood that one or more other features, numbers, steps, operations, constituent elements, or combinations thereof will be present and be added.

Unless otherwise defined, all terms including technical and scientific terms, which are used in the present specification, have the same meanings as are normally understood by a person of ordinary skill in the art to which the present disclosure pertains. The term as defined in a dictionary in general use should be construed as having the same meaning as interpreted in context in the relevant technology, and, unless otherwise explicitly defined in the present specification, is not construed as having an ideal meaning or an excessively-formal meaning.

The terms first, second, and so forth are employed in the present specification only in order to distinguish among different constituent elements and are used regardless of the order in which the different constituent elements are manufactured. A constituent element may vary in name between DETAILED DESCRIPTION OF THE INVENTION and each of the claims.

Figure 1B:
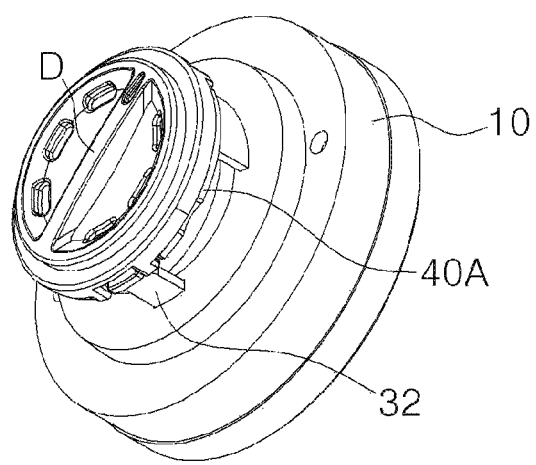

For convenience of describing a spool braking device using eddy current and a fishing reel equipped with the spool braking device according to the present disclosure, approximate reference directions are defined with reference to FIGS. 1A and 1B although such a definition is not precise. A direction in which gravity works is defined as a downward direction, and leftward, downward, leftward, and rightward directions are defined with respect to the center of each of FIGS. 1A and 2B. Unless otherwise specified, for description of an embodiment of the present disclosure with reference to the drawings, these reference directions are referred to throughout the present specification.

The spool braking device according to the present disclosure includes a braking plate, a magnet holder, and a holder displacement unit. The braking plate is provided on a first-side surface of a spool. The magnet has a magnet that is formed in a manner that faces the braking plate. The holder displacement unit displaces the magnet holder using eddy current that is generated between the braking plate and the magnet when the spool is rotated. When the spool is rotated, while moving in an axial direction of the spool, the magnet holder controls a rotational speed of the spool with a magnet force that varies with a distance between the braking plate and the magnet.

In the spool braking device according to the present disclosure, the holder displacement unit includes a receding portion, a pressing portion, or both, and a first elastic body. The receding portion, the pressing portion, or both are formed as a cam that has a bottom point and a top point that are obliquely connected to each other in a circumferential direction. The first elastic body elastically supports the magnet holder toward a first-side direction of increasing a distance to the braking plate.

Furthermore, the spool braking device according to the present disclosure may further include a slide cam into which an axial mount portion of the magnet holder is inserted. The pressing portion is configured as a first end cam that protrudes toward a second side along a circumferential direction from the slide cam. The receding portion is configured as a receding protrusion that protrudes from an outer circumferential surface of the axial mount portion and is brought into contact with the first end cam.

Moreover, the spool braking device according to the present disclosure includes a dial cam that is combined with a dial on a side cover, and has a second end cam that protrudes toward a second side along a circumferential direction and has a bottom point and a top point that are obliquely connected to each other. The slide cam includes a guide protrusion that protrudes in such a manner as to be brought into contact with the second end cam.

In addition, the spool braking device according to the present disclosure, a plurality of magnets are radially arranged in a circumferential direction on the magnet holder, and the magnet holder includes a magnet non-mount unit, on which a magnet is not mounted, in a predetermined section in a circumferential direction. The slide cam includes an end jaw portion, a wing portion, and an auxiliary magnet. The end jaw portion protrudes inward from a top point of the first end cam and is connected. The wing portion is provided at a position corresponding to the magnet non-mount unit. The auxiliary magnet is mounted on the wing portion and has the same polarity as the magnet.

In the spool braking device according to the present disclosure, the magnet holder includes an axial mount portion that is inserted into a front-surface axial portion of a spool cover. The pressing portion is configured as a first end cam that protrudes from an outer circumferential surface of the front-surface axial portion and is formed along a circumferential direction. The receding portion is configured as a receding protrusion that protrudes from an inner circumferential surface of the axial mount portion and is brought into contact with the first end cam.

In addition, the spool braking device according to the present disclosure includes a pressing plate, a slide cam, a dial cam, and a second elastic body. The pressing plate is arranged between the spool cover and a magnet holder and controls a distance by which the magnet holder moves. The slide cam is connected to the pressing plate at a first side of the spool cover and has a second end cam having a bottom point and a top point that are obliquely connected to each other in a circumferential direction. The dial cam is combined with a dial on a side cover and has a third end cam that protrudes along the circumferential direction in such a manner as to take on a shape corresponding to the second end cam and is brought int contact with the second end cam. The second elastic body elastically supports the slide cam toward a first-side direction of increasing a distance to the spool cover.

Furthermore, the spool braking device according to the present disclosure includes a slide cam that is connected to the magnet holder in such a manner as to be rotatable or movable backward and forward in a first direction or bidirectionally together with the magnet holder. The receding portion is configured as a first end cam that protrudes from an inner circumferential surface of the slide cam and has a bottom point and a top point that are obliquely connected to each other in a circumferential direction. The pressing portion is configured as a pressing protrusion that protrudes toward the first end cam from a first side of the slide cam and is brought into contact with the first end cap.

Moreover, in the spool braking device according to the present disclosure, the braking plate and the magnet arranged on the magnet holder have a non-overlapping opposite surface.

In addition, the spool braking device according to the present disclosure includes a dial cam that is combined with a dial on a side cover and includes the pressing protrusion.

Furthermore, a fishing reel according to the present invention includes a frame having a spool mounting unit, a spool mounted on the spool mounting unit, and a spool braking device described above.

The spool braking device using the eddy current and the fishing reel equipped with the spool braking device according to the present disclosure will be described below with reference to the accompanying drawings.

The spool braking device according to the present disclosure broadly includes braking plate (not illustrated), a magnet holder 20A, 20B, or 20C having a magnet M, and a holder displacement unit that replaces magnet holder 20A, 20B, or 20C, respectively. A fishing reel according to the present disclosure includes a frame (not illustrated) having a spool mounting unit, a spool (not illustrated), and the spool braking device described above.

Specifically, the frame has the spool mounting unit that is open at a first-side external surface. The spool is mounted in the spool mounting unit and has a braking plate on a first-side end portion. The magnet is mounted in the magnet holder and is provided in such a manner as to be spaced a predetermined distance away from the braking plate toward a first side thereof. A rotational speed of the spool is reduced with a varying magnetic force acting on the braking plate.

Holder displacement here is a vector quantity indicating a difference in position or angle from an initial state of the holder and a current changing state thereof. Furthermore, the holder displacement means a change in a forward-backward position of the magnet holder 20A, 20B, or 20C toward an axial direction of the spool.

Specifically, as illustrated in FIGS. 1A and 1B to 17, a fishing reel according to an embodiment of the present disclosure includes a bottom portion 11A and a sidewall portion 11B, a spool cover 10, a magnet holder 20A, 20B, or 20C, and a holder displacement unit. The bottom portion 11A and the sidewall portion 11B are mounted on a first-side end portion of a spool mounting unit and forms an accommodation unit 11 that is open at a second-side surface. The spool cover 10 has a front-surface axial portion 12A protruding from a second-side surface of the bottom portion 11A. The front-surface axial portion 12A is inserted into the magnet holder 20A, 20B, or 20C. The magnet holder 20A, 20B, or 20C is combined with the front-surface axial portion 12A in a manner that is bidirectionally rotatable toward a rotational direction of a spool and is movable backward and forward toward an axial direction of the spool in the accommodation unit 11 and has a magnet M on a front surface. The holder displacement unit displaces the magnet holder 20A, 20B, or 20C using eddy current that is generated when the spool is rotated. The holder displacement unit includes a pressing portion and a first elastic body. The pressing portion is provided on a first side of the magnet holder 20A, 20B, or 20C. A receding portion is brought into contact with the pressing portion. The first elastic body elastically supports the magnet holder 20A, 20B, or 20C toward a first-side direction of increasing a distance to the braking plate. The receding portion, the pressing portion, or both are foiled as an end cam having a bottom point and a top point that are obliquely connected to each other in a circumferential direction. In the fishing reel configured as described above, when the spool is rotated at or below a predetermined speed, a fundamental braking force acting on the braking plate is generated in a state where with an elastic force of the first elastic body, the magnet holder 20A, 20B, or 20C does not advance toward the braking plate. Furthermore, when the spool is rotated at above the predetermined speed, while eddy current is increased between the braking plate and a magnet M, the receding portion moves upward along an end-cam structure, and thus the magnet holder 20A, 20B, or 20C advances, thereby decreasing a distance between the magnet M and the braking plate. Consequently, high-speed rotation of the spool generates and increases an additional braking force acting on the braking plate.

The frame and the spool have a publicly known structure. The spool cover 10 is combined with a side cover (not illustrated) at the palm side and is detachably attached to the frame. The side cover here has various detachment and attachment structures. Typically, a lock lever is detachably attached to the frame by employing a structure in which locking and combination are achieved by rotation.

In the spool cover 10 according to the present disclosure, the front-surface axial portion 12A and a rear-surface axial portion 12B protrude in the form of a cylinder from center portions, respectively, of inner and outer surfaces of the bottom portion 11A. The spool covers 10 according to first to third embodiments, respectively, are distinguished according to the present or absence of the end cam functioning as the pressing portion in each embodiment, a combination position of a slide cam 30A, 30B, or 30C, and the presence of absence of each of a guide hole 11a, an insertion hole 11c, and a guide groove 11d for connecting the magnetic holders 20A, 20B, and 20C and the slide cam 30A, 30B, or 30C, respectively. The spool covers 10 according to the first to third embodiments, respectively, are all substantially the same in that, with the eddy current and the end-cam structure, the magnet holder 20A, 20B, or 20C including the magnet M directly operates to move backward and forward with respect to the braking plate that is fixed to the spool and is rotated together therewith.

Furthermore, according to the present disclosure, a plurality of magnets M are provided in such a manner as to be spaced apart a predetermined distance in a circumferential distance of the magnet holder 20A, 20B, or 20C. At this point, the magnets M having different polarities are arranged in an intersecting manner. The magnet has a non-overlapping opposite surface that does not overlap the braking plate.

Next, an essential inventive aspect of the present disclosure is described. The fishing reel according to the first embodiment of the present disclosure, as illustrated in FIGS. 1A, 1B to 8A, and 8B, includes the slide cam 30A. The front-surface axial portion 12A is inserted into the slide cam 30A. The slide cam 30A is combined with the front-surface axial portion 12A in a manner that is bidirectionally rotatable toward the rotational direction of the spool in the accommodation unit 11. The slide cam 30A has a first end cam 31A forming the pressing portion protruding toward the second side along the circumferential direction. The magnet holder 20A includes an axial mount portion 21 and a receding protrusion 22A. The axial mount portion 21 is inserted between the front-surface axial portion 12A and an inner circumferential surface of the slide cam 30A. The receding protrusion 22A protrudes from an outer circumferential surface of the axial mount portion and is brought into contact with the first end cam 31A.

The spool cover 10 according to the first embodiment does not have the insertion hole 11c and the guide groove 11d according to the second and third embodiment, respectively. However, the spool cover 10 has the guide hole 11a and an ascending and descending hole 11b. The guide hole 11a is formed in the front- and rear-surface axial portions 12A and 12B in a manner that passes therethrough from top to bottom. A guide protrusion 32 is inserted into the guide hole 11a. The ascending and descending hole 11b is formed in an edge portion of the spool cover 10 in a manner that passes therethrough from top to bottom. An ascending and descending protrusion 25 is inserted into the ascending and descending hole 11b.

Unlike in the second embodiment, the spool cover 10 according to the first embodiment does not have the end cam, functioning as the pressing portion, on the front-surface axial portion 12A and that the first end cam 31A is provided on the slide cam 30A into which the front-surface axial portion 12A is inserted, thereby functioning as the pressing portion.

The magnet holder 20A according to the first embodiment is a member in the form of a ring. A plurality of magnet mounting grooves are formed in a second-side surface (an inner front surface) of the magnet holder 20A in such a manner as to be radially arranged along the circumferential direction. The axial mount portion 21 in the form of a cylinder protrudes from an edge of an axial mount hole in a center portion of a first-side surface (an outer rear surface) thereof. An inner diameter of the axial mount portion 21 corresponds to an outer diameter of the front-surface axial portion 12A and an inner diameter of the slide cam 30A. An outer diameter of the axial mount portion 21 corresponds to an inner diameter of the first end cam 31A provided on the slide cam 30A. For assembling, the front-surface axial portion 12A that is inserted into the first end cam 31A is inserted into the magnet holder 20A, along the slide cam 30A.

The receding protrusion 22A protruding from the outer circumferential surface of the axial mount portion 21 has a wedge-shaped structure in which a width is decreased toward a rear-end side (an outer side), and is radially arranged along a circumferential direction of the axial mount portion 21. Thus, the receding protrusion 22A is brought into contact with a leading end surface of the first end cam 31A for being supported thereon.

According to the first embodiment that serves as a fundamental embodiment, a magnet plate MP in the form of a ring is additionally mounted in a mounting groove 20a in a first side surface of the magnet holder 20A. The magnet plate MP, as a conductor, prevents a magnetic force of the magnet M from acting toward a rear surface of the magnet holder, thereby increasing a fundamental magnetic force on the braking plate.

The fishing reel according to the present disclosure includes a holder cap 23 and a first compression spring 24. The front-surface axial portion 12A is inserted into the holder cap 23 for being combined therewith. The holder cap 23 has a skirt portion that has an inner diameter greater than an outer diameter of the front-surface axial portion 12A. Opposite end portions of the first compression spring 24 are supported between the front-surface axial portion 12A and the skirt portion, and thus the first compression spring 24 exerts an elastic force in opposite directions, thereby forming the first elastic body.

A hook protrusion 23a on the holder cap 23 is hooked to an inner circumferential surface of the front-surface axial portion 12A, and thus the holder cap 23 is mounted on the front-surface axial portion 12A. Accordingly, the magnet holder 20A is elastically supported in such a manner as to move backward in an outward direction of increasing the distance to the braking plate, with the holder cap 23 serving as a support point.

Moreover, in the magnet holder 20A, the ascending and descending protrusions 25 protrude from the edge portions, respectively, which are adjacent to opposite sides of the mounting groove 20a into which the magnet plate MP is provided. The ascending and descending protrusions 25 are inserted into the ascending and descending holes 11b, respectively. The ascending and descending protrusions 25 guide backward and forward movement (descending and ascending) of the magnet holder 20A.

The slide cam 30A is a member in the form of a ring that corresponds to the axial mount portion 21 and is arranged along the edge portion at a position at which the first end cam 31A corresponds to the receding protrusion 22A.

Figure 2:
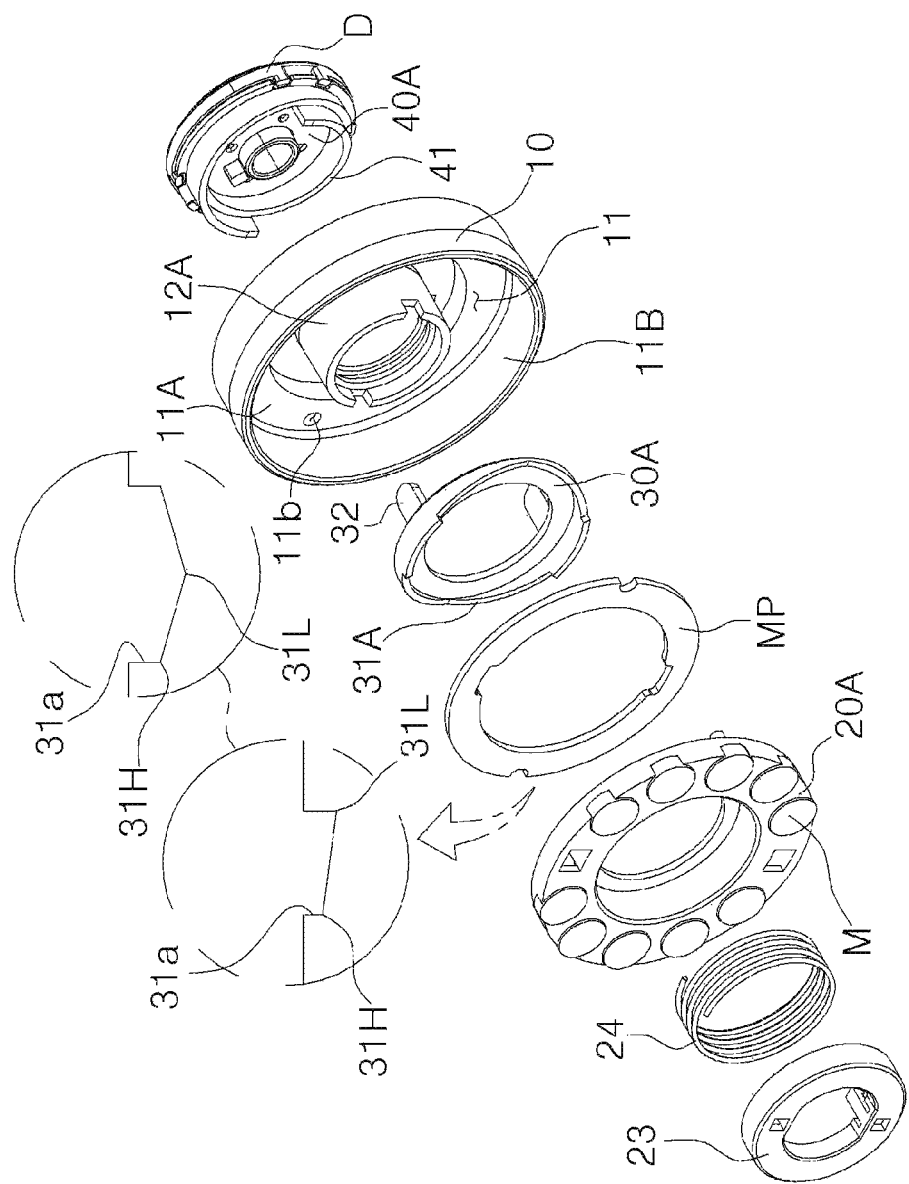
FIGS. 2 and 3 are respective exploded perspective views of FIGS. 1A and 1B.
Figure 3:
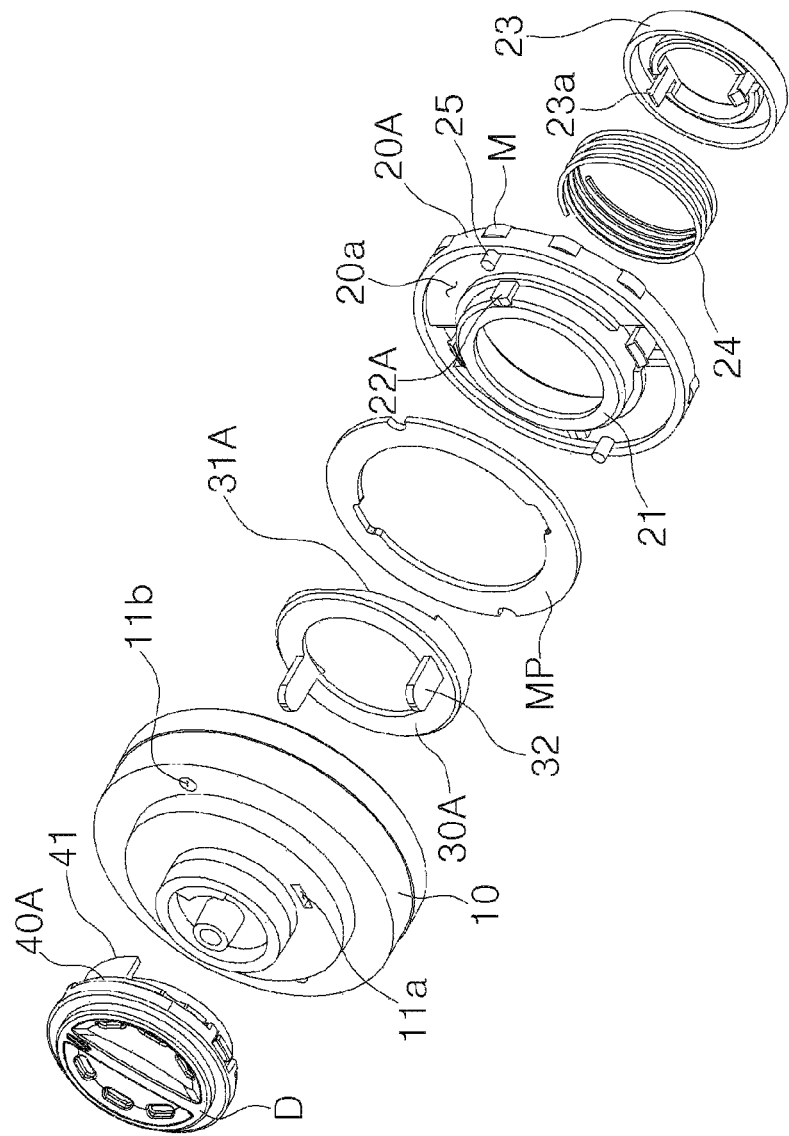
Figure 4A:
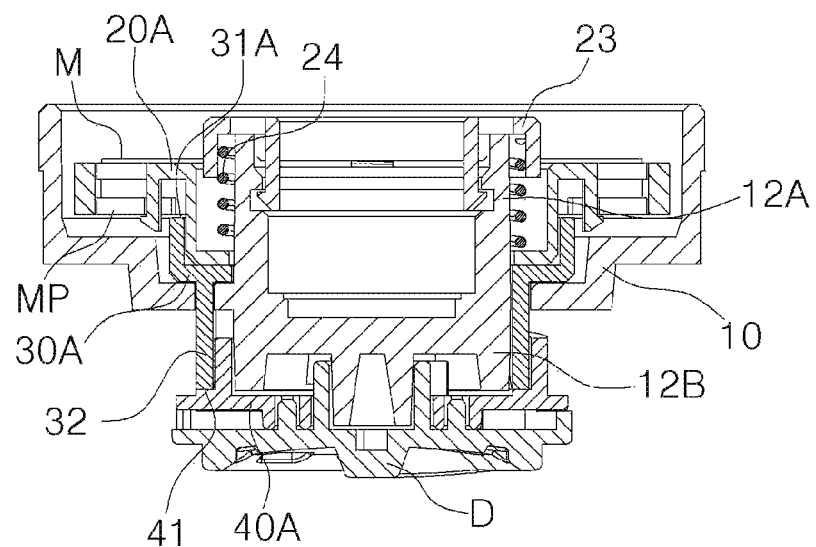
FIGS. 4A and 4B are respective cross-sectional views of FIGS. 1A and 1B.
Figure 4B:
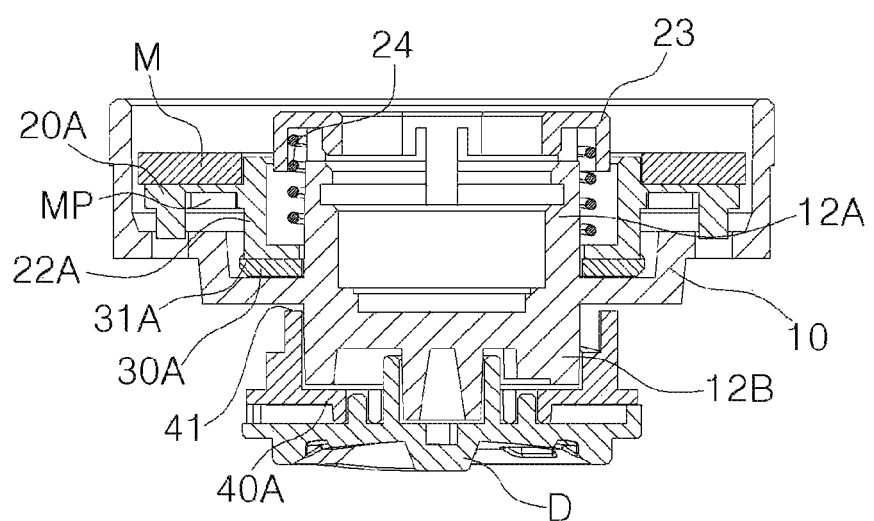
Figure 5A:
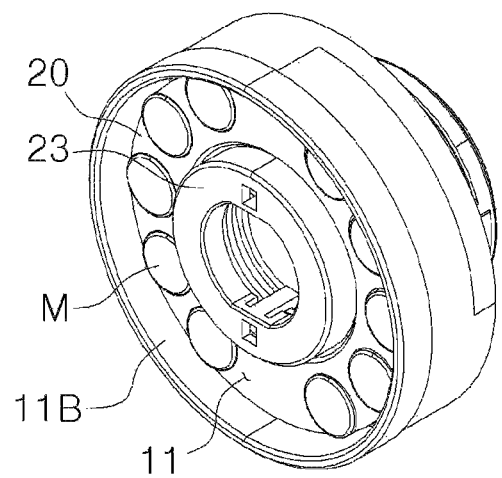
FIGS. 5A and 5B are perspective views each illustrating essential components according to a modification example of the first embodiment of the present disclosure.
Figure 5B:
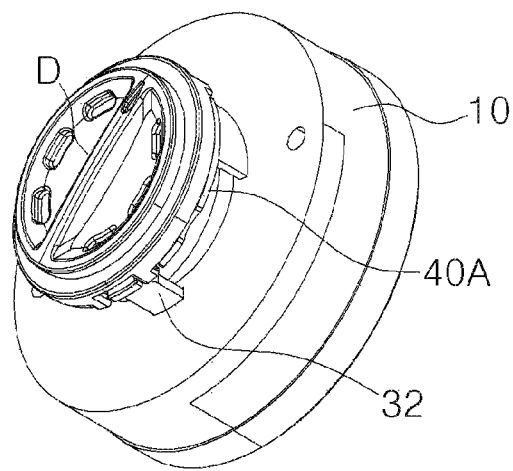
Figure 6:
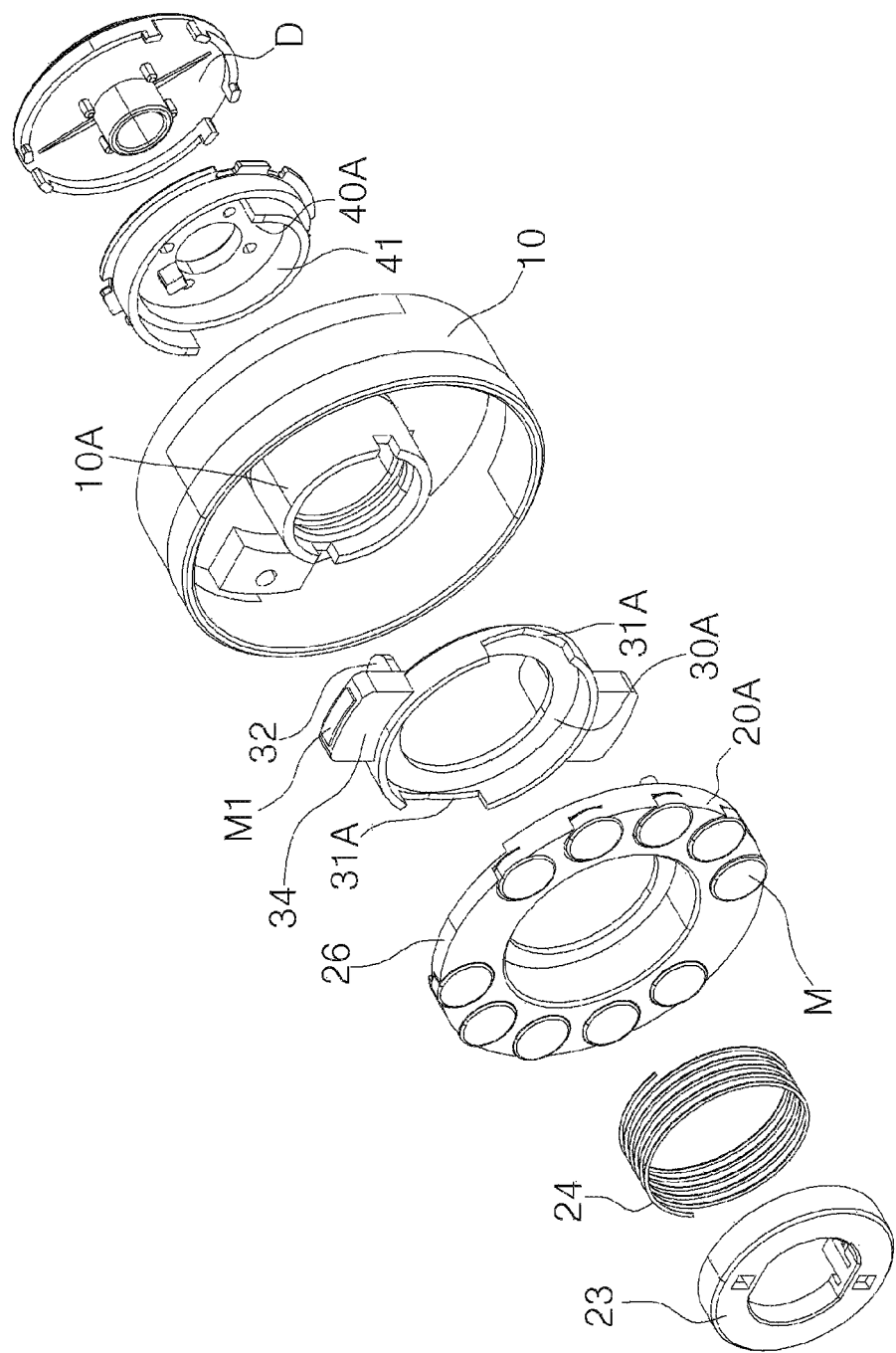
FIGS. 6 and 7 are respective exploded perspective views of FIGS. 5A and 5B.
Figure 7:
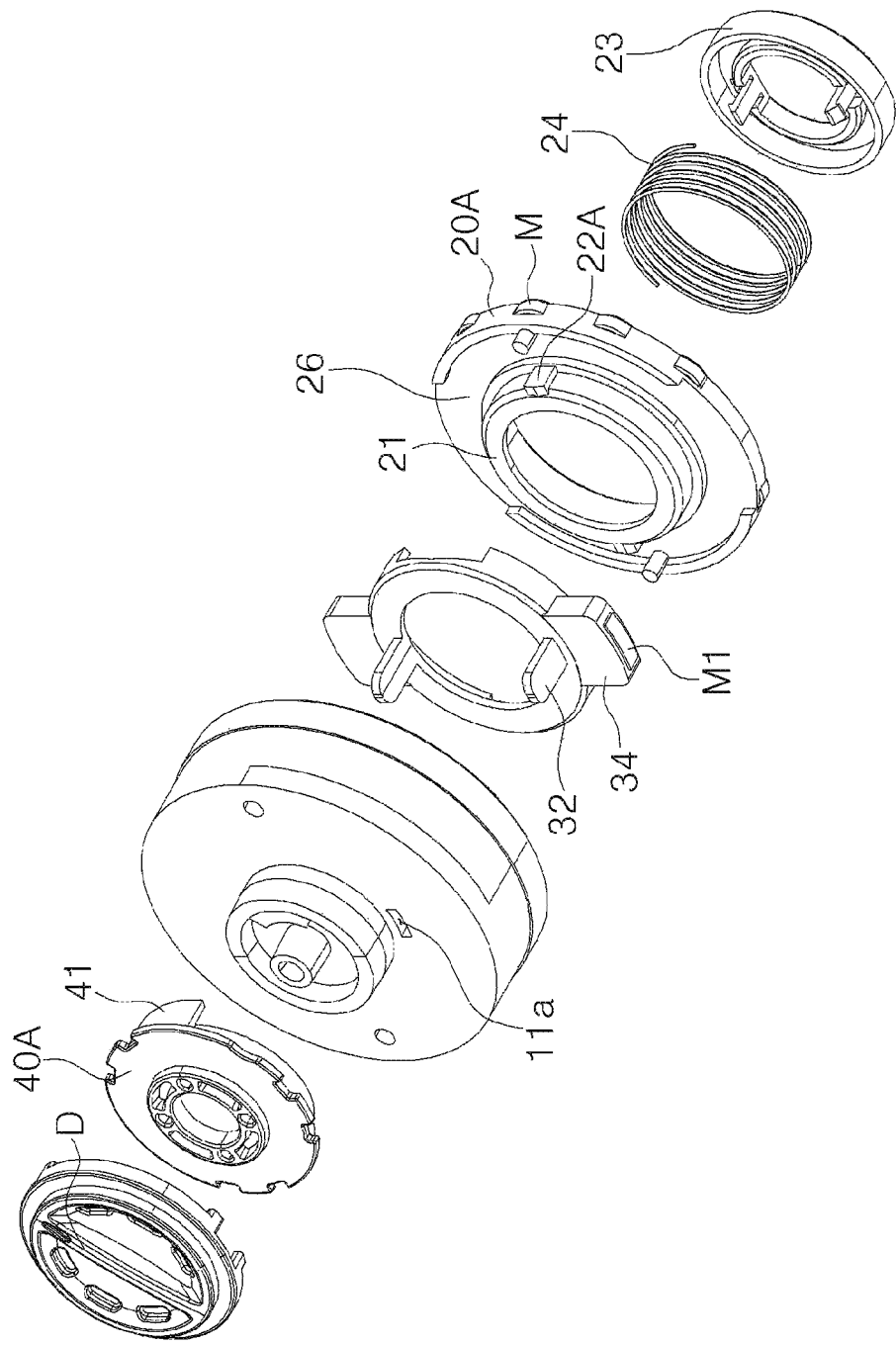
Figure 8A:
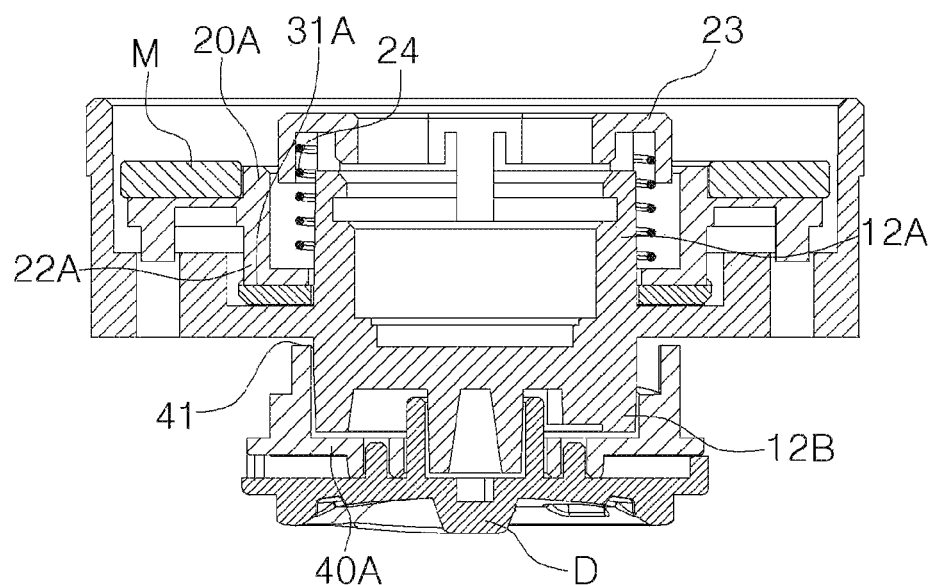
FIGS. 8A and 8B are respective cross-sectional views of FIGS. 5A and 5B.
Figure 8B:
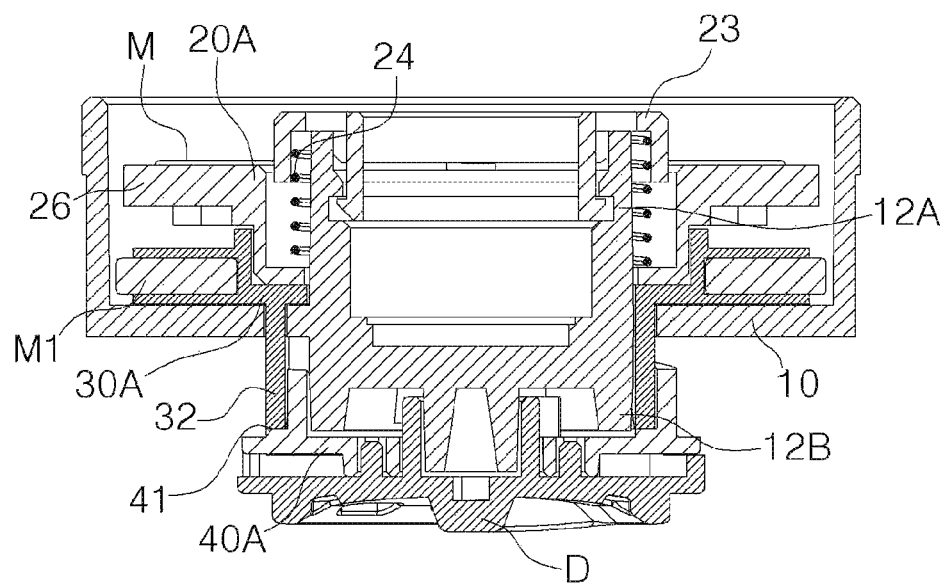
Figure 9A:
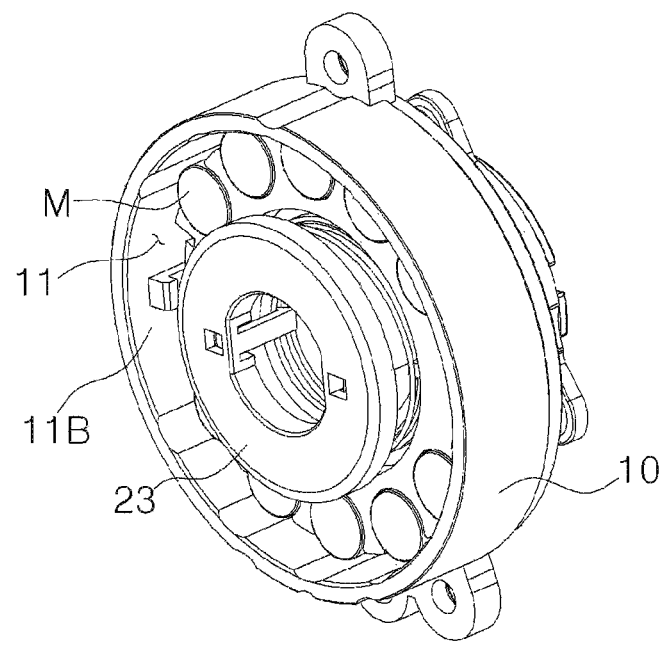
FIGS. 9A and 9B are perspective views each illustrating essential components according to a second embodiment of the present disclosure.
Figure 9B:
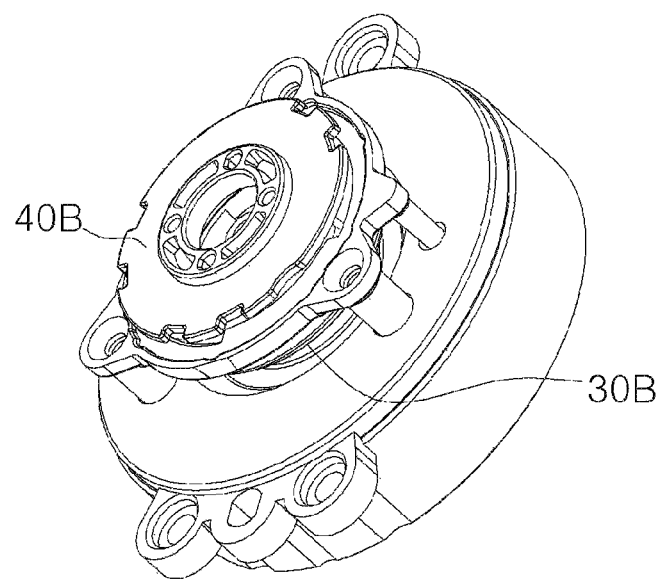
Figure 10:
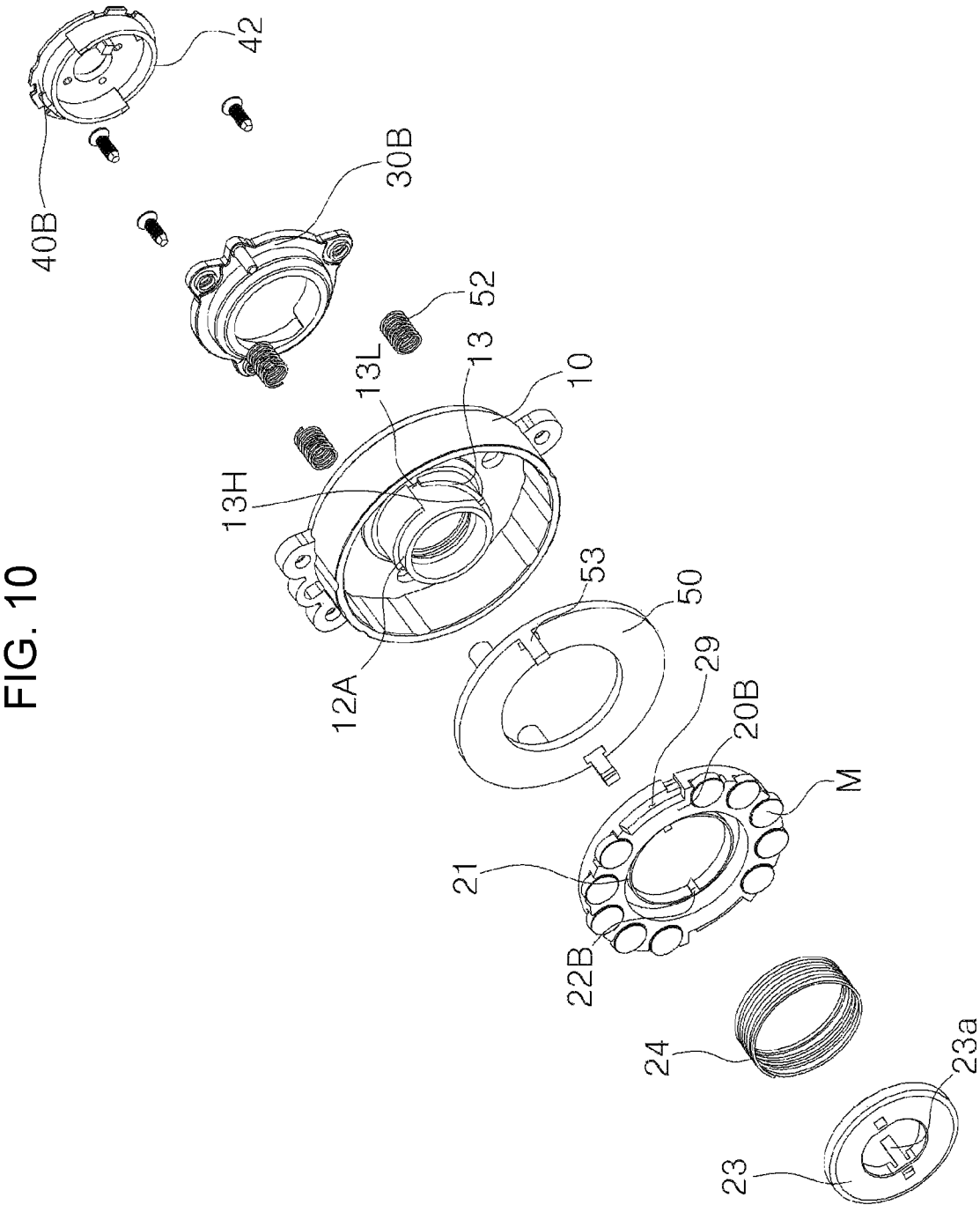
FIGS. 10 and 11 are respective exploded perspective views of FIGS. 9A and 9B.
Figure 11:
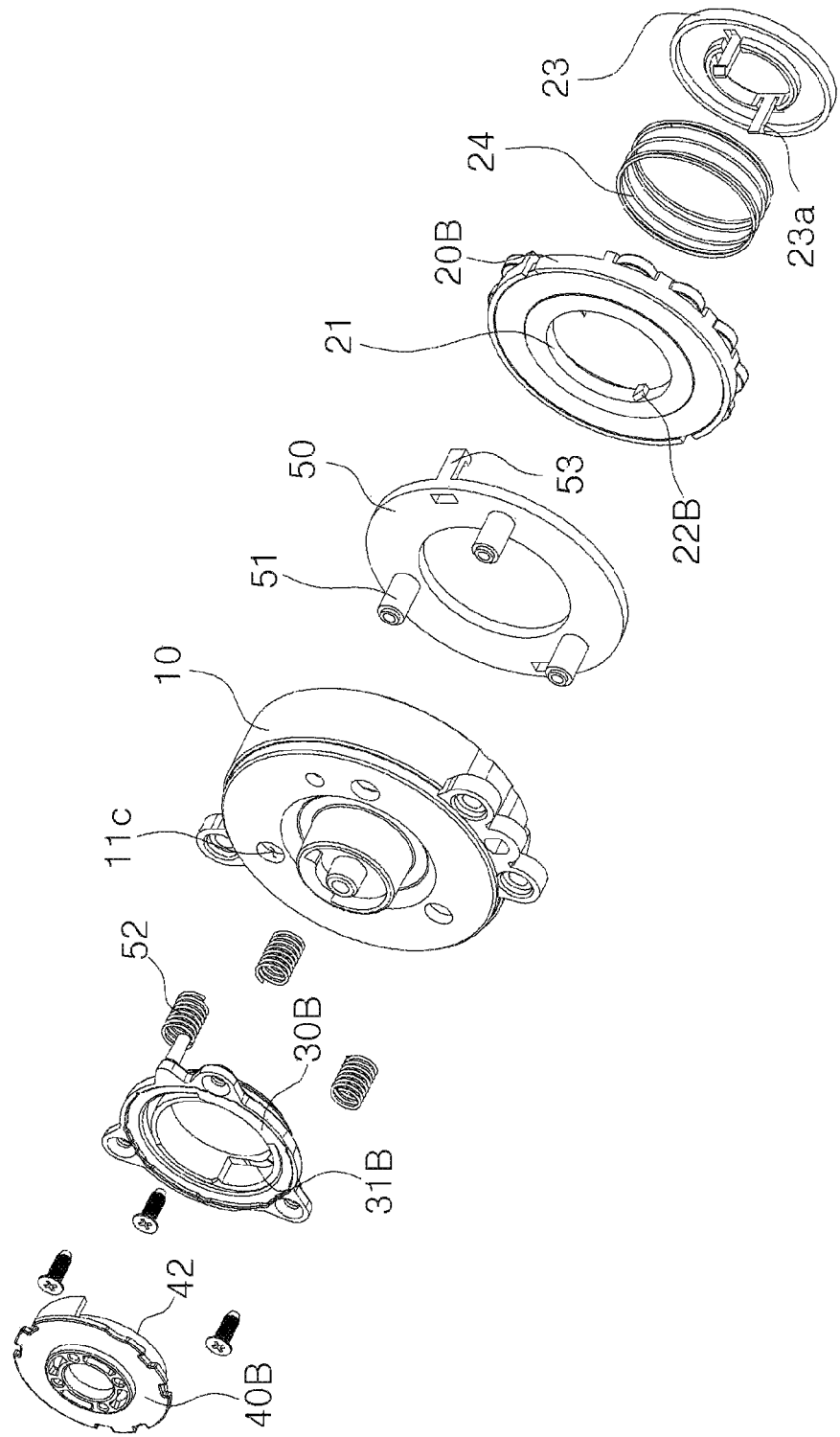
Figure 12A:
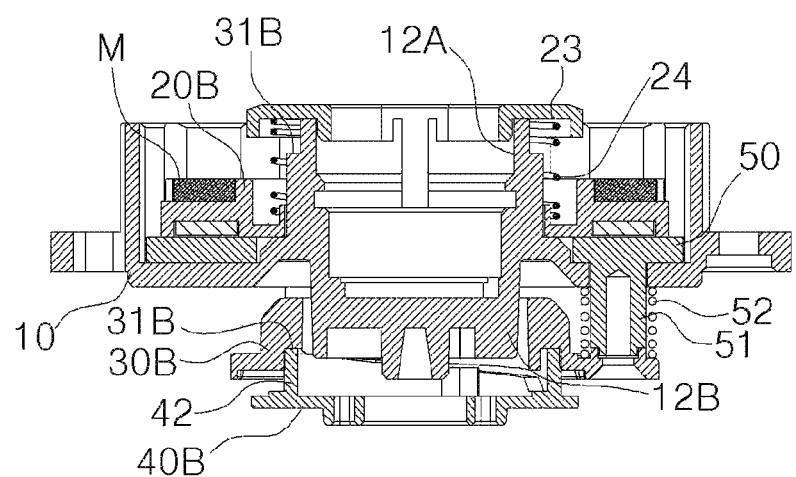
FIGS. 12A and 12B are respective cross-sectional views of FIGS. 9A and 9B.
Figure 12B:
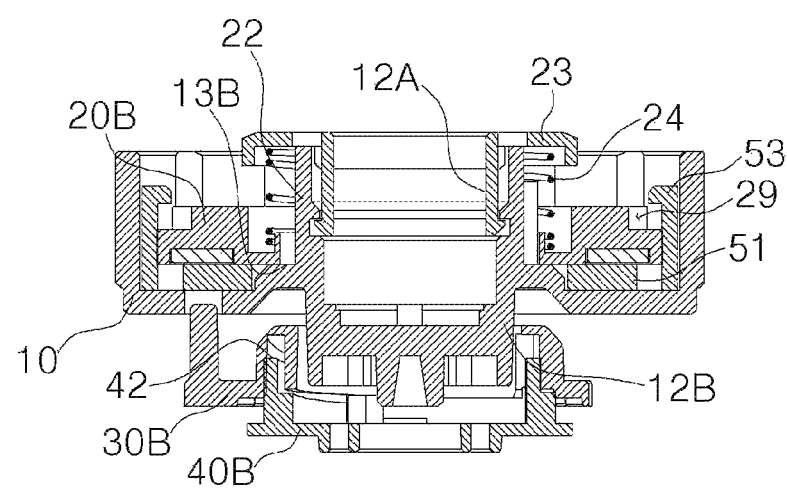
Figure 13A:
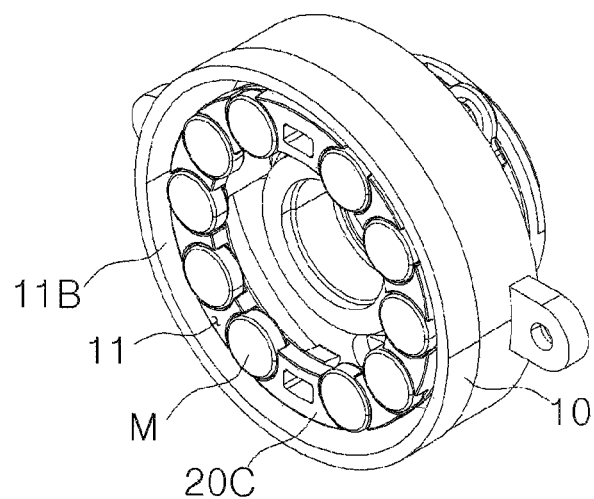
FIGS. 13A and 13B are perspective views each illustrating essential components according to a third embodiment of the present disclosure.
Figure 13B:
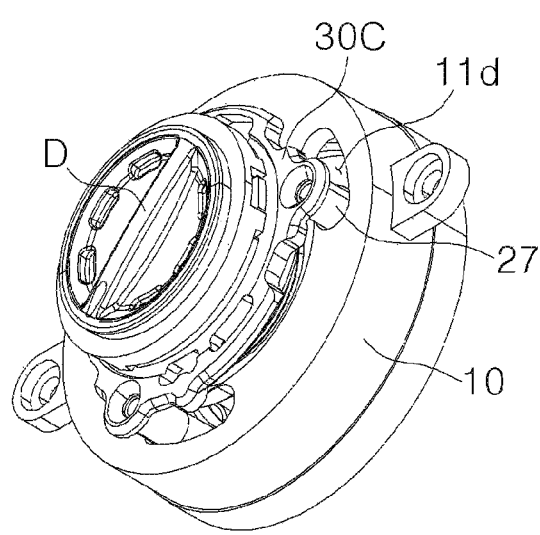
Figure 14:
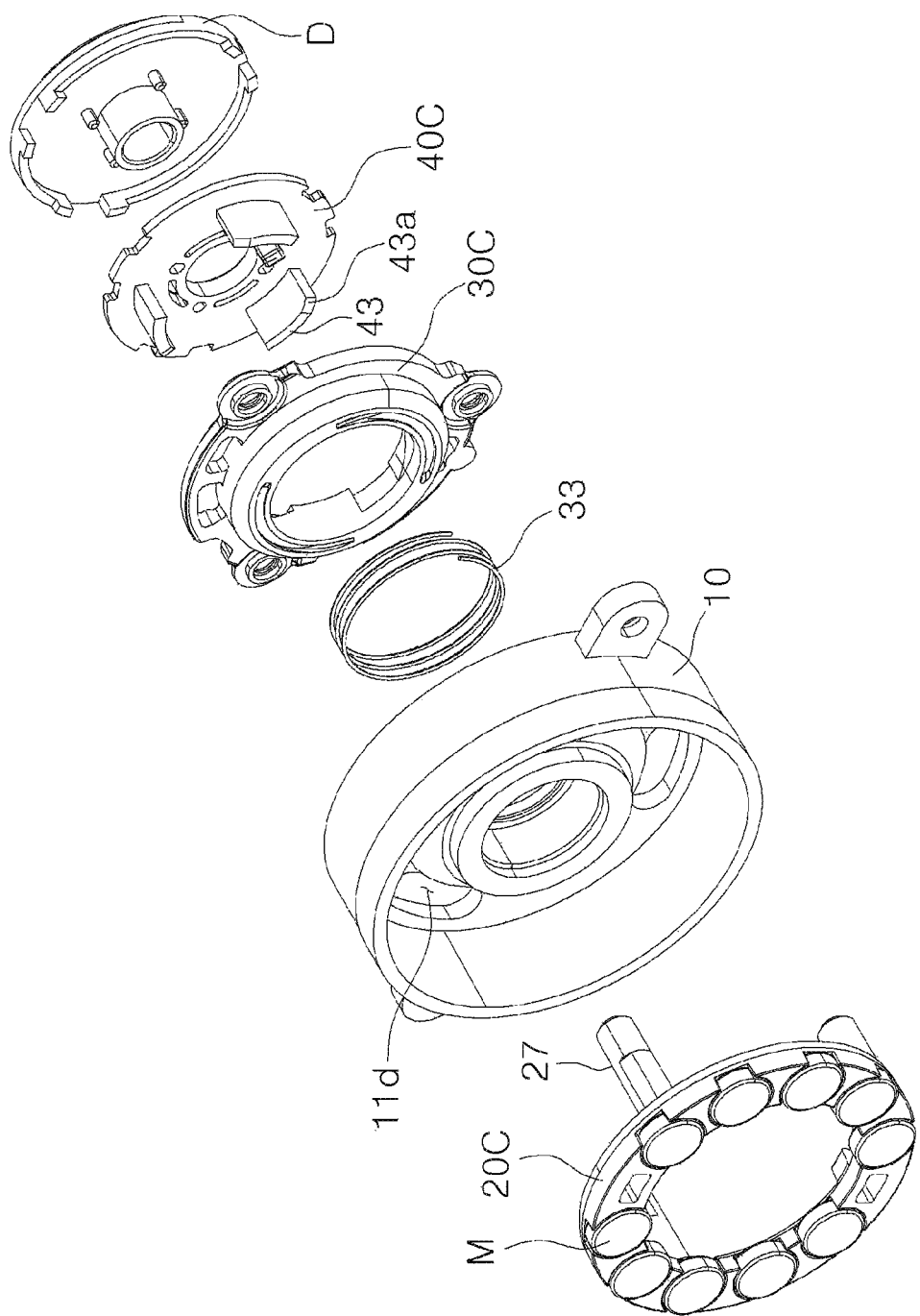
FIGS. 14 and 15 are respective exploded perspective views of FIGS. 13A and 13B.
Figure 15:
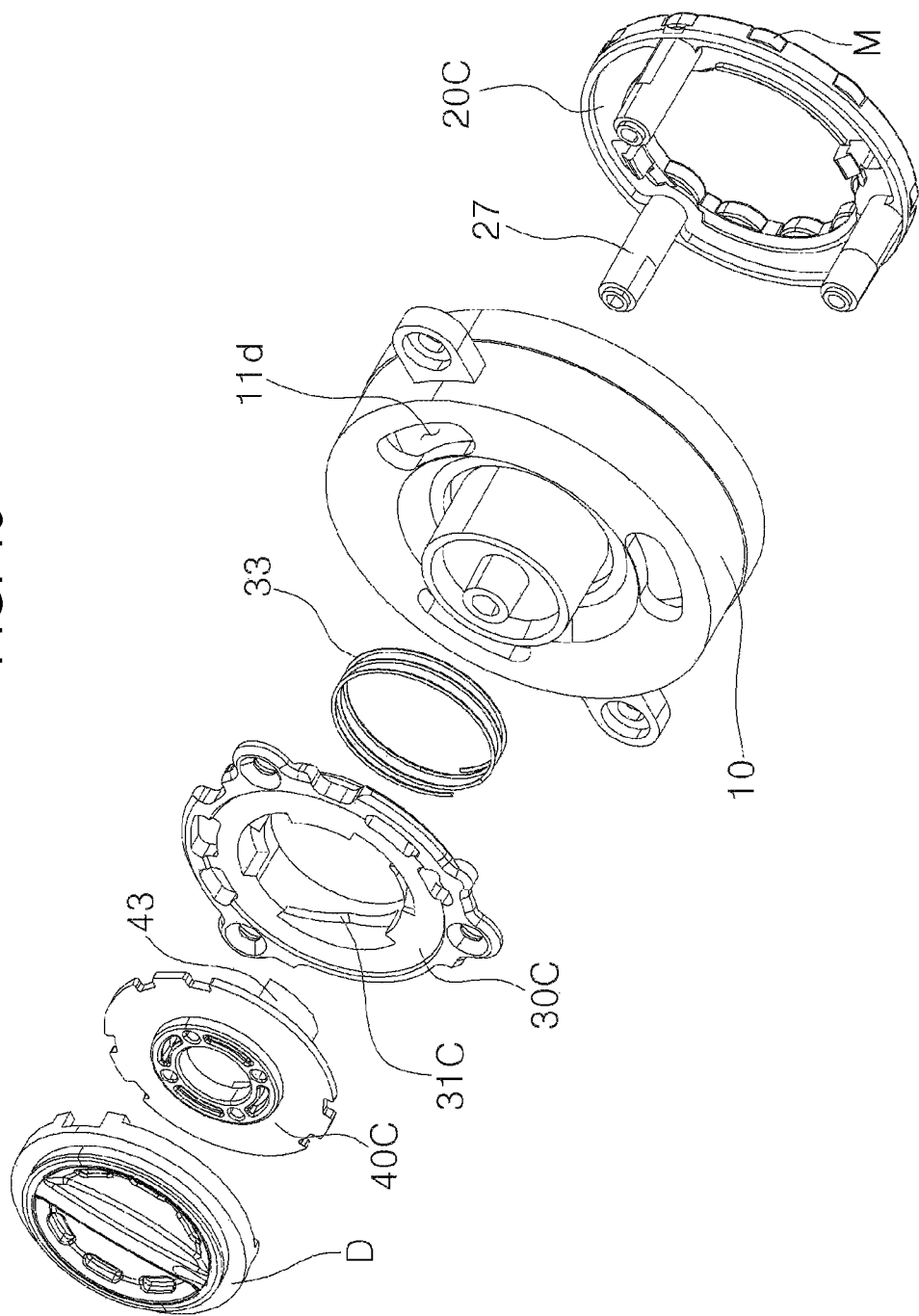
Figure 16:
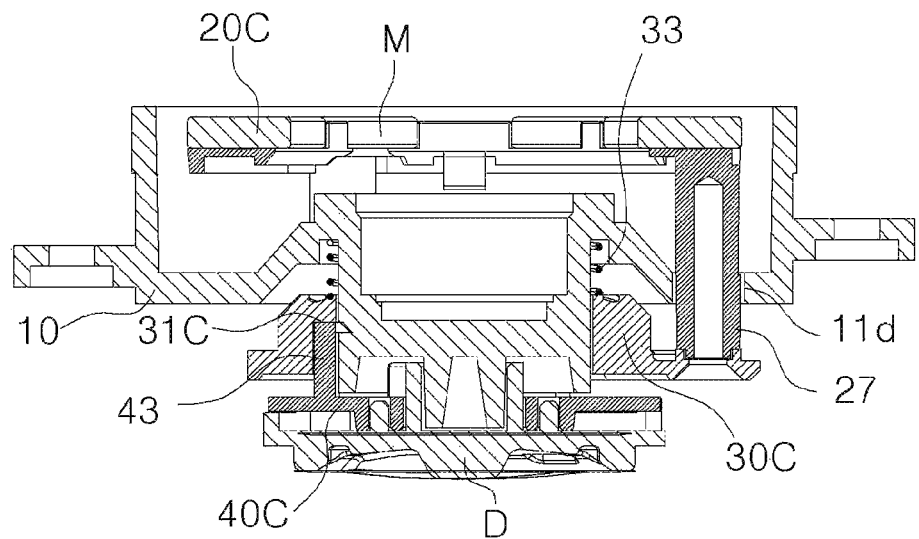
FIG. 16 is a cross-sectional view of FIGS. 13A and 13B.
Figure 17:
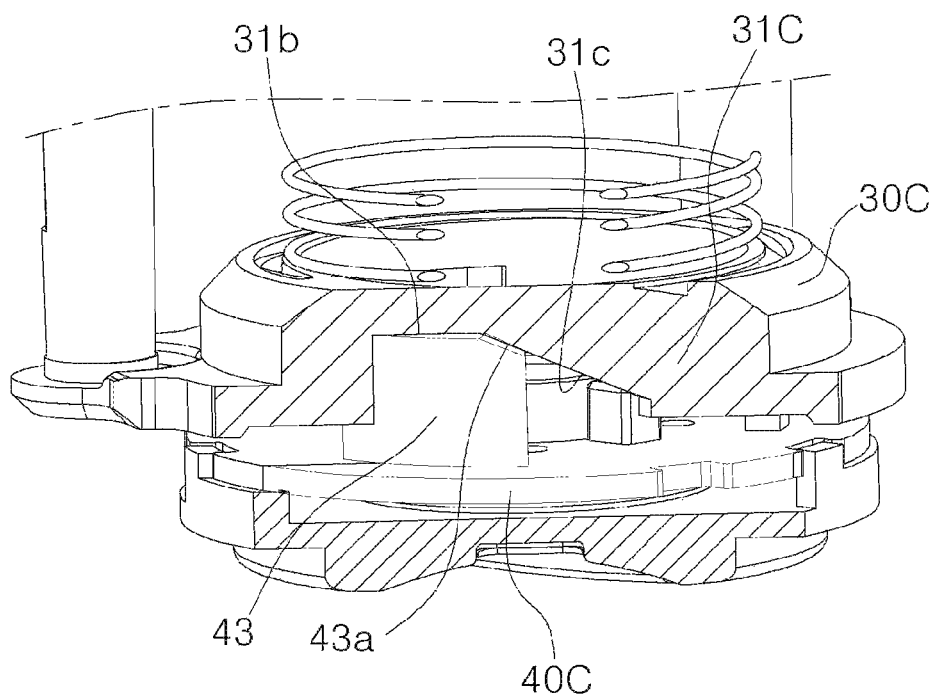
FIG. 17 is a cross-sectional perspective view of FIGS. 13A and 13B.

As illustrated in an exploded diagram in the left circle in FIG. 2, a bottom point 31L of the first end cam 31A is connected in a first direction to a top point 31H thereof in an obliquely upward manner. Alternatively, as illustrated in an exploded diagram in the right circle in FIG. 2, the bottom point 31L of the first end cam 31A may be bidirectionally connected to two top points 31H thereof in an obliquely upward manner. In the case of the first end cam 31A operating in a first direction, only during casting, the magnet holder 20A advances, riding along the first end cam 31A. During reeling, the magnet holder 20A does not operate to advance. In the case of the first end cam 31A operating bidirectionally, during casting and reeling, the magnet holder 20A operates to advance.

Accordingly, the fishing reel according to the present disclosure includes a dial cam 40A. The dial cam 40A is combined with a dial D provided on the side cover at a first side of the spool cover 10, thus is combined in a bidirectionally rotatable manner in the circumferential direction, and has a second end cam 41 protruding toward the second side along the circumferential direction and having the bottom point 41L and the top bottom 41H connected obliquely to each other. The slide cam 30A includes a guide protrusion 32 combined in an axial direction of the front-surface axial portion 12A in a manner that is movable backward and forward, protruding from a first-side surface, inserted into the spool cover 10 in a manner that passes therethrough, and brought into contact with the second end cam 41. As the dial cam 40A is bidirectionally rotated, the guide protrusion 32 moves, riding on the second end cam 41. Thus, the slide cam 30A may change a backward-forward position of the magnet holder 20A, thereby adjusting the fundamental braking force acting on the braking plate.

The guide protrusion 32 has a rear end portion in the form of an arc and is inserted into the guide hole 11a in the spool cover 10 in a manner that passes therethrough.

The dial cam 40A has the second end cam 41 formed in an obliquely upward manner in the first direction along the edge. In a case where two guide protrusions 32 and two second end cams 41 are provided as illustrated in the drawings, the guide protrusion 32 at a first side is provided more adjacent to the edge side of the dial cam 40A than the guide protrusion 32 at a second side in such a manner that a variable height per one revolution is maximally extendable. Correspondingly, two second end cams 41 are arranged in such a manner as to overlap inward and outward, so that they are positioned on a path for each guide protrusion 32 to be rotated.

The dial cam 40A is connected to a dial D that is rotatably combined with the side cover. Thus, with the dial D, a user can perform an operation of rotating the dial cam 40A.

Therefore, in a case where casting (or reeling) is performed using the fishing reel equipped with this magnet-mounted braking device, when the spool is rotated at a low speed, an elastic force of the first compression spring 24 is higher than the eddy current generated between the magnet M fixed with respect to the rotating braking plate (the conductor) and the magnet plate (MP). Accordingly, the magnet holder 20A is not pressed in a spool rotation direction, and thus the magnet holder 20A is positioned at the bottom point 31L of the first end cam 31A. Consequently, a state where the magnet M (and the magnet plate MP) is positioned a maximum distance away from the braking plate is maintained, and thus only a minimum fundamental braking force based on a separation distance is generated.

In a case where the spool accelerates to a high rotation speed, the eddy current generated between the braking plate and the magnet M is increased, and thus a rotational force of the magnet holder 20A that is generated by the eddy current becomes higher than the elastic force of the first compression spring 24. Consequently, the magnet holder 20A is pressed in such a manner as to be rotated in the same direction together with the spool. Accordingly, the magnet holder 20A positioned at the bottom point 31L of the first end cam 31A ascends toward the top point 31H along the leading end surface of the first end cam 31A. Consequently, the magnet holder 20A advances toward the braking plate and is brought in proximity thereto. Thus, an increase in magnetic force due to the proximity to the magnet M (and the magnet plate MP) generates and increases an additional braking force acting on the braking plate, that is, the spool, thereby preventing a backlash phenomenon.

Moreover, with the braking by the magnet M (and the magnet plate MP), the rotational speed of the spool is decreased, and thus the eddy current is decreased. Accordingly, the elastic force of the first compression spring 24 is applied to the magnet holder 20A, and thus the receding protrusion 22A moves back to the bottom point 31L, riding on the first end cam 31A. Consequently, the magnet holder 20A moves back, and thus a braking force is decreased when the spool is rotated at a low speed.

In addition, in a spool stop state, when the user rotates the dial D on the side cover in the first direction with his/her hand, the guide protrusion 32 positioned at the bottom point 41L of the second end cam 41 ascends toward the top point 41H of the second end cam 41, and thus the slide cam 30A advances. Accordingly, a fundamental setting position of the magnet M (and the magnet plate MP) varies. Therefore, the user can make an arbitrary amendment for an increase in the fundamental braking force generated in a state where the spool is rotated at a low speed. Through this adjustment, a point in time at which an additional braking force is generated can be moved up as much as the fundamental braking force is increased. Thus, the user can precisely control the braking force according to his/her need.

As a modification example of the first embodiment, as illustrated in FIGS. 5A, 5B to 8A, and 8B, a plurality of magnets M are radially arranged in the circumferential direction on the magnet holder 20A, and the magnet holder 20A includes a magnet non-mount unit 26, on which the magnet M is not mounted, in a predetermined section in the circumferential direction. The slide cam 30A includes an end jaw portion 31a, a wing portion 34, and an auxiliary magnet M1. The end jaw portion 31a protrudes inward from the top point 31H of the first end cam 31A and is connected. The wing portion 34 protrudes from an outer circumferential surface at a position corresponding to the magnet non-mount unit 26. The auxiliary magnet M1 is mounted on the wing portion 34 and has the same polarity as the magnet M. The receding protrusion 22A reaching the top point 31H of the first end cam 31A is hooked to the end jaw portion 31a, and thus a repulsive force between the magnet M and the auxiliary magnet M1 is generated. Accordingly, the magnet holder 20A advances additionally, and thus a maximum braking force acting on the braking plate is generated.

The magnet plate MP is omitted from the modification example of the first embodiment. Thus, a magnetic force is not generated on the magnet non-mount unit 26.

The end jaw portion 31a protrudes toward the axial direction of a spool shaft from the top point 31H of the first end cam 31A, and thus rotational movement of the receding protrusion 22A is no longer allowed.

The magnet non-mount unit 26 is provided at a position (the wind portion 34) corresponding to a section on which the first end cam 31A is not formed.

The auxiliary magnet M1 has the same polarity as the plurality of magnets M. When the receding protrusion 22A on the slide cam 30A is positioned at the bottom point 31L of the first end cam 31A, the wing portion 34 is positioned on the same line as the magnet non-mount unit 26. Thus, the repulsive force is not generated between the magnet M and the auxiliary magnet M1.

As the spool is rotated at a high speed, the receding protrusion 22A ascends toward the top point 31H of the first end cam 31A, and the auxiliary magnet M1 on the wing portion 34 moves away from the magnet non-mount unit 26.

When the receding protrusion 22A reaches the top point 31H of the first end cam 31A and is hooked to the end jaw portion 31a, the auxiliary magnet M1 overlaps the magnet M, arranged at a position closest to the magnet non-mount unit 26, on the same line, and thus a repulsive force is generated due to the same polarity. This repulsive force instantaneously pushes the slide cam 30A inward for forward movement, and thus the magnets M move in maximum proximity to the braking plate. Accordingly, a braking force due to a magnetic force is maximally generated.

Therefore, in a case where the spool is rotated at a superhigh speed exceeding a predetermined speed limit, the receding protrusion 22A does not move along the first end cam 31A, and thus the braking force is not gradually increased. Instead, due to the repulsive force between the magnet M and the auxiliary magnet M1, the braking force is instantaneously increased instantaneously. Thus, the maximum braking force is immediately generated. Accordingly, the backlash phenomenon due to the superhigh-speed rotation can be prevented.

Next, according to the second embodiment of the present disclosure, as illustrated in FIGS. 9A, 9B to 12A, and 12B, the spool cover 10 includes the front-surface axial portion 12A and a first end cam 13. The front-surface axial portion 12A protrudes from the second-side surface of the bottom portion 11A. The first end cam 13 protrudes from an outer circumferential surface of the front-surface axial portion 12A and forms a pressing portion formed along the circumferential direction. The magnet holder 20B includes the axial mount portion 21 and a receding protrusion 22B. The axial mount portion 21 is inserted into the outer circumferential surface of the front-surface axial portion 12A. The receding protrusion 22B protrudes from an inner circumferential surface of the axial mount portion 21 and forms a receding portion that is brought into contact with the first end cam 13.

A difference of the second embodiment of the present invention from the first and third embodiment is that the pressing portion is not provided on a separate slide cam or dial cam and that the first end cam 13 is provided on the front-surface axial portion 12A of the spool cover 10 and thus possibly functions as the pressing portion.

At this point, in the drawings, typically, the first end cam 13 is illustrated as being inclined upward from the bottom point 13L to the top points 13H on the first and second sides. However, it is also possible that the first end cam 13 is formed only in the first direction. The end jaw portion 13a is formed at the top point 13H, and thus the receding protrusion 22B is prevented from extending beyond the top point 13H.

The receding protrusion 22B has the same shape as in the first embodiment. However, unlike in the first embodiment, the receding protrusion 22B is formed in such a manner as to protrude from an inner circumferential surface of the magnet holder 20B.

Moreover, a fishing reel according to the present disclosure includes a pressing plate 50, a slide cam 30B, a dial cam 40B, and a second elastic body. The pressing plate 50 is mounted in the accommodation unit 11, supports a first-side surface of the magnet holder 20B, and has a connection protrusion 51 that passes through the spool cover 10 toward a first side thereof for being inserted thereinto. The slide cam 30B is combined with the connection protrusion 51 and is movable backward and forward toward the axial direction of the spool shaft together with the pressing plate 50, at the first side of the spool cover 10. The slide cam 30B includes a second end cam 31B that protrudes from an inner circumferential surface of the slide cam 30B and has the bottom point and the top point that are obliquely connected in the circumferential direction. The dial cam 40B is combined with a dial D provided on the side cover, at one side of the slide cam 30B and is rotatable backward and forward. The dial cam 40B has a third end cam 42 that protrudes along the circumferential direction in such a manner as to take on a shape corresponding to the second end cam 31B and that is brought into contact with the second end cam 31B. The second elastic body elastically supports the slide cam 30B toward a first-side direction of increasing a distance to the spool cover 10. In the fishing reel configured as described above, as the dial cam 40B is bidirectionally rotated, the second end cam 31B moves, riding on the third end cam 42. Thus, the slide cam 30B changes a backward-forward position of the magnet holder 20B, thereby adjusting the fundamental braking force acting on the braking plate.

The pressing plate 50 is provided in such a manner as to have the form of a ring that corresponds to the magnet holder 20B and to come into contact with a first-side surface (more precisely, the magnet plate MP) of the magnet holder 20B for covering. The connection protrusion 51 may move backward and forward together with the magnet holder 20B, in a state of being inserted into the insertion hole 11c in the spool cover 10. However, the magnet holder 20B is rotatable backward and forward. By contrast, the pressing plate 50 is only movable backward and forward.

Unlike in the first embodiment, the slide cam 30B is insertion-combined with the rear-surface axial portion 12B of the spool cover 10 and, with the connection protrusion 51, is connected to the magnet holder 20B, thereby being rotatable backward and forward together therewith.

The second end cam 31B has a shape similar to that of the first end cam 13. However, a difference of the second end cam 31B from the first end cam 13 is that the second end cam 31B is inclined only in the first direction. The third end cam 42 of the dial cam 40B is formed in such a manner as to take on a shape corresponding to the second end cam 31B and is brought into contact therewith.

The connection protrusion 51 is inserted into a second compression spring 52. The second compression spring 52 elastically supports the slide cam 30B in such a manner as to move backward toward the outside of the spool cover 10 in the first-side direction of increasing the distance to the spool cover 10.

According to the second embodiment, as well as the first embodiment, due to the eddy current generated when the spool is rotated at a high speed, the magnet holder 20B is rotated, riding on the first end cam 13, and thus the magnet M advances toward the braking plate. Accordingly, an additional braking force is generated and is increased. When the dial cam 40B is operated with the dial D on the side cover, the slide cam 30B operates to advance. Thus, the pressing plate 50 brings the magnet holder 20B into proximity with the braking plate. Consequently, an arbitrary amendment can be adjusted for change a setting of an initial braking force that is generated when the spool is not rotated and when the spool is rotated at a low speed.

In addition, the pressing plate 50 includes a stopping protrusion 53 that protrudes from a front-surface edge portion. The magnet holder 20B includes a longitudinal groove 29, formed in such a manner as to have a predetermined length, in the front-surface edge portion. When the magnet holder 20B advances, the longitudinal groove 29 is combined with a hook portion of the stopping protrusion 53 in a manner that is hooked thereto.

The stopping protrusion 53 has a length large enough so that the hooking portion is spaced a predetermined distance away from the longitudinal groove 29.

Therefore, movement of the magnet holder 20B is stopped by the stopping protrusion 53. Thus, a maximum advancement position to which the magnet holder 20B can maximally advance is limited.

That is, regardless of a position of the pressing plate 50, a distance by which the holder 20B maximally advances is limited by the hooking portion of the stopping protrusion 53. Accordingly, when the spool is rotated at a high speed, the magnet holder 20B can be prevented from continuously advancing toward the braking plate. Thus, the magnet holder 20B is not brought into contact with the braking plate.

According to the third embodiment of the present disclosure, as illustrated in FIGS. 13A and 13B to 17, the guide groove 11d having a predetermined length is formed in the circumferential direction in the spool cover 10 in a radially arranged manner. The magnet holder 20C includes a combination protrusion 27 that passes through the guide groove 11d for being inserted thereinto. The fishing reel according to the third embodiment of the present disclosure includes the slide cam 30C and a pressing protrusion 43. The slide cam 30C is combined with the combination protrusion 27 and is rotatable bidirectionally and movable backward and forward together with the magnet holder 20C, at the first side of the spool cover 10. The slide cam 30C has a first end cam 31C that protrudes from an inner circumferential surface of the slide cam 30C and forms a receding portion that has the bottom point and the top point that are obliquely connected to each other in the circumferential direction. The pressing protrusion 43 protrudes toward the first end cam 31C from a first side of the slide cam 30C and forms a pressing portion that is brought into contact with the first end cam 31C.

The guide groove 11d has the form of an arc. The magnet holder 20C and the slide cam 30C that are provided on front- and rear-surface sides, respectively, of the spool cover 10 are connected to each other through the combination protrusion 27, and are rotatable in the circumferential direction along the guide groove 11d.

For axial mounting, the slide cam 30C is inserted into the rear-surface axial portion 12B of the spool cover 10. The compression spring 33 into which the rear-surface axial portion 12B is inserted functions as the first elastic body, and thus elastically supports the magnet holder 20C, combined with the slide cam 30C, in an outward direction of increasing the distance to the braking plate. Accordingly, when the spool is rotated at a low speed, the compression spring 33 moves the magnet holder 20C backward into the accommodation unit 11, thereby adjusting an additional braking force.

Moreover, the fishing reel includes a dial cam 40C. The dial cam 40C is combined with the dial D provided on the side cover at the first side of the slide cam 30C, thus is combined in a bidirectionally rotatable manner in the circumferential direction, and includes the pressing protrusion 43. As the dial cam 40C is bidirectionally rotated, the pressing protrusion 43 moves, riding on the first end cam 31C. Thus, the slide cam 30C changes a backward-forward position of the magnet holder 20C, thereby adjusting the fundamental braking force acting on the braking plate.

At this point, the first end cam 31C is configured to have an inclination surface 31c inclined in the first direction upward from the end of a flat surface 31b that extends a predetermined distance from the bottom point. The pressing protrusion 43 has a tapered portion 43a at a first-side edge portion. The tapered portion 43a is formed in a manner that corresponds to a gradient of the inclination surface 31c.

According to the third embodiment, as well as the first and second embodiment, in a state where the pressing protrusion 43 is positioned on the flat surface 31b (the bottom point) of the first end cam 31C, due to the eddy current generated when the spool is rotated at a high speed, the magnet holder 20C moves upward, riding on the tapered portion 43a of the pressing protrusion 43, and thus the magnet M advances toward the braking plate. Accordingly, an additional braking force is generated and is increased. When casting is performed through an operation of rotating the dial cam 40C with the dial D on the side cover, an initial position of the magnet holder 20C can be changed, and thus an initial braking force can be arbitrarily adjusted.

That is, the magnet holder 20C advances toward the braking plate as much as the dial D is rotated in such a manner that the pressing protrusion 43 is positioned at a point on a center portion of the inclination surface 31c. Thus, the fundamental braking force is increased. In this state, when the spool is rotated at a high speed, the first end cam 31C moves, riding on the tapered portion 43a. Accordingly, the magnet M advances toward the direction of the braking plate, and thus an additional braking force is generated and is increased.

The spool braking device using the eddy current and the fishing reel equipped with the spook braking device according to the present disclosure are described above with reference to the accompanying drawings. However, it is apparent to a person of ordinary skill in the art to which the present disclosure pertains that various modifications, alterations, and substitutions would be made to the embodiments of the present disclosure. These various modifications, alterations, and substitutions should be interpreted as falling within the scope of the present disclosure.

What is claimed is:

1. A spool braking device comprising:
a braking plate provided on a first-side surface of a spool;
a magnet holder having a magnet formed in such a manner as to face the braking plate; and
a holder displacement unit displacing the magnet holder using eddy current generated between the braking plate and the magnet when the spool is rotated,
wherein the holder displacement unit comprises: a receding portion, a pressing portion, or both that are formed as a cam that has a bottom point and a top point that are obliquely connected to each other;
a first elastic body elastically supporting the magnet holder in a first-side direction of increasing a distance to the braking plate; and
a slide cam into which an axial mount portion of the magnet holder is inserted, wherein, when the spool is rotated, while moving in an axial direction of the spool, the magnet holder controls a rotational speed of the spool with a magnet force acting on the braking plate, the magnet force varying with a distance between the braking plate and the magnet, and wherein the pressing portion is configured as a first end cam protruding toward a second side along a circumferential direction from the slide cam, and the receding portion is configured as a receding protrusion protruding from an outer circumferential surface of the axial mount portion and brought into contact with the first end cam.

2. The spool braking device of claim 1, wherein the braking plate and the magnet arranged on the magnet holder have a non-overlapping opposite surface.

3. A spool braking device comprising:
a braking plate provided on a first-side surface of a spool;
a magnet holder having a magnet formed in such a manner as to face the braking plate; and
a holder displacement unit displacing the magnet holder using eddy current generated between the braking plate and the magnet when the spool is rotated,
wherein the holder displacement unit comprises:
a receding portion, a pressing portion, or both that are formed as a cam that has a bottom point and a top point that are obliquely connected to each other; and
a first elastic body elastically supporting the magnet holder in a first-side direction of increasing a distance to the braking plate,
wherein the magnet holder comprises:
an axial mount portion inserted into a front-surface axial portion of a spool cover, and
wherein the pressing portion is configured as a first end cam protruding from an outer circumferential surface of the front-surface portion and formed along a circumferential direction, and the receding portion is configured as a receding protrusion protruding from an inner circumferential surface of the axial mount portion and brought into contact with the first end cam.

4. The spool braking device of claim 3, further comprising:
a pressing plate arranged between the spool cover and the magnet holder and controlling a distance by which the magnet holder moves.

5. The spool braking device of claim 3, wherein the braking plate and the magnet arranged on the magnet holder have a non-overlapping opposite surface.

6. A spool braking device comprising:
a braking plate provided on a first-side surface of a spool;
a magnet holder having a magnet formed in such a manner as to face the braking plate; and
a holder displacement unit displacing the magnet holder using eddy current generated between the braking plate and the magnet when the spool is rotated,
wherein the holder displacement unit comprises:
a receding portion, a pressing portion, or both that are formed as a cam that has a bottom point and a top point that are obliquely connected to each other;
a first elastic body elastically supporting the magnet holder in a first-side direction of increasing a distance to the braking plate; and
a slide cam connected to the magnet holder in such a manner as to be rotatable or movable backward and forward in a first direction or bidirectionally, together with the magnet holder, and wherein the receding portion is configured as a first end cam protruding from an inner circumferential surface of the slide cam and having a bottom point and a top point that are obliquely connected to each other, and the pressing portion is configured as a pressing protrusion protruding toward the first end cam from a first side of the slide cam and brought into contact with the first end cam.

7. The spool braking device of claim 6, wherein the braking plate and the magnet arranged on the magnet holder have a non-overlapping opposite surface.

* * * * *